United States Patent

Park et al.

Patent Number: 5,825,930
Date of Patent: Oct. 20, 1998

[54] MOTION ESTIMATING METHOD

[75] Inventors: Dong-seek Park, Daegu, Rep. of Korea; John Villasenor; Feng Chen, both of Los Angeles, Calif.

[73] Assignees: Samsung Electronics Co., Ltd., Kyungki-Do, Rep. of Korea; The Regents of the University of California, Oakland, Calif.

[21] Appl. No.: 811,189

[22] Filed: Mar. 5, 1997

[51] Int. Cl.$^6$ ....................... G06K 9/36
[52] U.S. Cl. ............................. 382/236
[58] Field of Search ............... 382/232, 236, 382/238, 239; 348/390, 394, 396, 402, 403, 404, 405, 407, 409, 411, 412, 413, 415, 416, 419, 420, 421, 430

[56] References Cited

U.S. PATENT DOCUMENTS

| | | | |
|---|---|---|---|
| 5,278,647 | 1/1994 | Hingorani et al. | 348/416 |
| 5,550,847 | 8/1996 | Zhu | 348/409 |
| 5,650,860 | 7/1997 | Uz | 348/390 |
| 5,654,759 | 8/1997 | Augenbraun et al. | 348/405 |
| 5,682,204 | 10/1997 | Uz et al. | 348/409 |
| 5,703,966 | 12/1997 | Astle | 382/236 |
| 5,717,615 | 2/1998 | Pirson et al. | 348/699 |

*Primary Examiner*—Jose L. Couso
*Attorney, Agent, or Firm*—Sughrue, Mion, Zinn, Macpeak & Seas, PLLC

[57] ABSTRACT

A motion estimating method for determining a motion vector, using a bit rate-distortion technique in image compression. The motion estimating method includes the steps of obtaining a motion vector $(x_o, y_o)$ which minimizes a predetermined error function, assuming a preferred motion vector (x, y), calculating the difference (x-diff, y-diff) between $(x_o, y_o)$ and (x, y), obtaining the number of bits needed to encode the x-diff and y-diff, determining a bias based on a bias model according to the bit number, obtaining a final cost function value based on the difference between a cost function value and a bias, comparing the final cost function value with a predetermined allowance limit, determining the assumed motion vector (x, y) as a motion vector for a current macroblock and updating the allowance limit by using the cost function value, if the cost function value is smaller than the predetermined allowance limit and discarding the assumed motion vector (x, y) if the cost function value is not smaller than the predetermined allowance limit. The disclosed method is successful in increasing the compression rate.

7 Claims, 3 Drawing Sheets

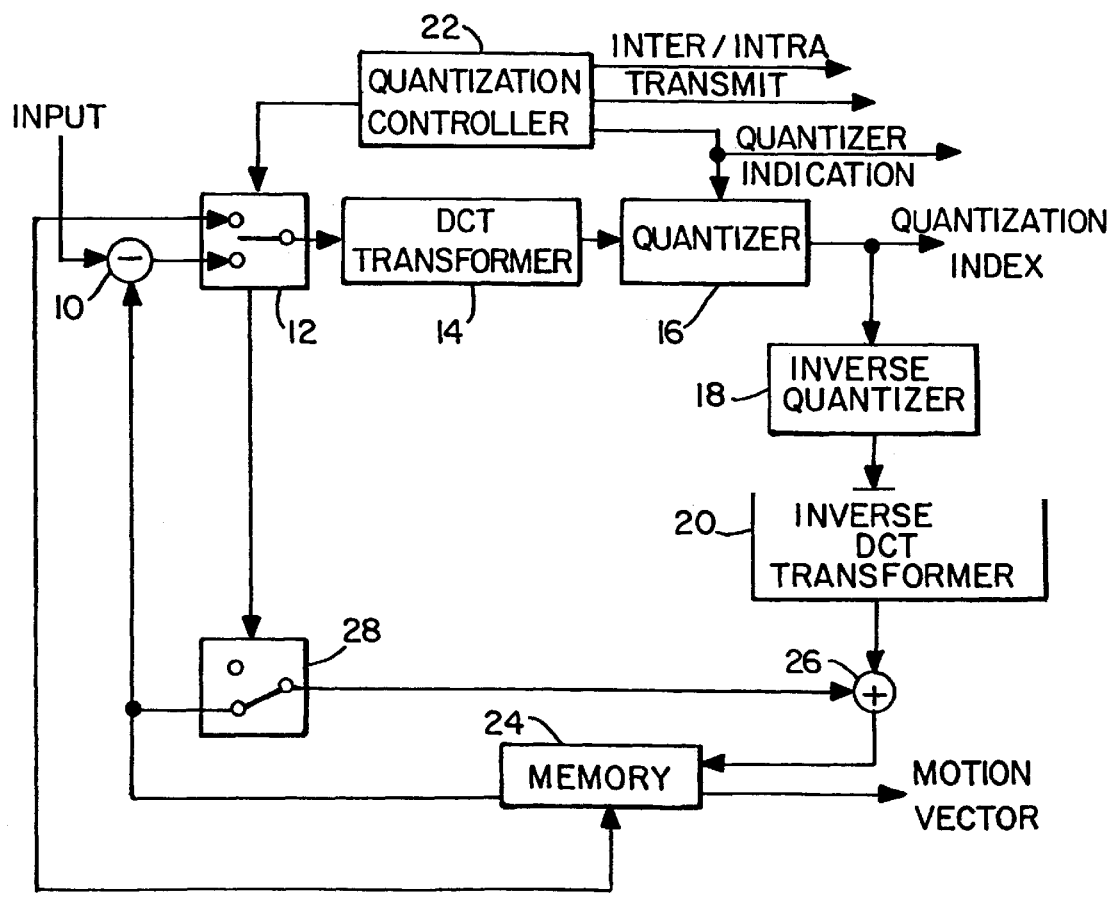

MOTION ESTIMATING METHOD

BACKGROUND OF THE INVENTION

The present invention relates to a motion estimating method, and more particularly, to a motion estimating method for obtaining a motion vector that yields a better and higher compression rate for the compression of image data, using a bit rate-distortion technique.

In general, a great amount of video data is required to be digitally processed in order to generate digital images and show multidimensional characteristics. Therefore, to process this digital image and the corresponding large amounts of data, and to transmit and store the processed digital image, data compression is required. Techniques for compression are implemented based in part on the bandwidth of the communications line used for transmission or the capacity of a storing medium for storing data.

Standardization of compression of moving pictures (i.e., digital image data) has been developed by the Moving Picture Expert Group (MPEG) in JTC1/SC29 of the International Organization for Standardization-International Electrotechnical Commission (IOS-IEC). In addition, the International Telecommunications Union-Telecommunications standardization sector (ITU-T) has conducted research to prepare video coding standards based on an ATM protocol, for image transmission in a future B-ISDN, and has recently recommended several H.26x standards. The H.263 proposal of the H.26x standards pertains to video coding for low bit-rate communications, and can be used for such devices as a video conferencing system.

According to the H.263 standard, in transmitting a series of images, an image is sampled at a predetermined time interval and the sampled images are encoded at both intra-mode and inter-mode.

To remove temporal redundancy, a motion estimating method of a block matching algorithm is used (in the time-axis direction for motion compensation coding). In this block matching algorithm, each frame is divided into macroblocks of a predetermined size, and a candidate block having a similar image to previous and current frame is obtained. Then, a motion vector and the difference between a corresponding block and the candidate block are coded.

Generally, in estimating a motion vector with maximum block matchability, a candidate block is selected as the block having the smallest function value derived from an estimation function, such as a sum of the absolute difference (SAD) function, or a mean absolute error (MAE) function:

$$SAD = \sum_x \sum_y |f(x, y) - f_i(x, y)| \quad (1)$$

$$MAE = \frac{1}{MN} \sum_x^M \sum_y^N [f(x, y) - f_i(x, y)]^2$$

where f and $f_i$ indicate the sizes of signals in a current frame and the previous frame, respectively, and M and N are the numbers of horizontally and vertically arranged pixels in a block.

Meanwhile, to increase the code rate in the motion vector coding, the number of bits is reduced by encoding only the difference between a corresponding block and a block selected from adjacent blocks by a predetermined predicting method.

FIG. 1 illustrates a motion vector predicting method recommended by the H.263 standard. In FIG. 1, MV indicates a motion vector of a current block. The labels MV1, MV2, and MV3, represent candidate predictors, and respectively indicate a motion vector of a previous block, a motion vector of an upper block, and a motion vector of an upper right block. A predictor is obtained from these candidate predictors by calculating a median value, using a median filter. Only the difference between the motion vector of the current block and the predictor is encoded and transmitted. Thus, though the motion vector of the current block MV ranges from (−16, 0), (0, −16), and (16, −16), for a 16×16 block, as an example, the above prediction coding reduces the amount of data required to be transmitted and variable-length coded, since there is little difference between motion vectors of adjacent blocks.

FIG. 2 is a schematic diagram of a video source encoder for the H.263 standard. Referring to FIG. 2, the source encoder has a subtractor 10 for subtracting the output of an inverse DCT transformer 20 from an input video signal, a selector 12 for selecting the output of the subtractor 10 or the output of the inverse DCT transformer 20, according to a control signal of a quantization controller 22, a DCT transformer 14 for DCT-transforming the output of the selector 12, a quantizer 16 for quantizing the output of the DCT transformer 14 and producing a quantizing index for transform coefficients, an inverse-quantizer 18 for inverse-quantizing the output of the quantizer 16 for estimation coding, the inverse DCT transformer 20 for inverse-DCT transforming the output of the inverse-quantizer 18, and the quantization controller 22 for controlling the quantization in the quantizer 16 and generating and outputting a control signal to the selector 12 and selector 28 for selecting intra-frame coding or inter-frame coding and a quantizer index.

The output of the inverse DCT transformer 20 is coupled to a first input of an adder 26, whose other input is coupled to an output of the second selector 28. The output of the adder 26 is coupled to an input of a picture memory 24 with motion compensated variable delay. Another input of the memory 24 is coupled to the input video signal. The output of the memory includes a motion vector and is also coupled to an input of the subtractor 10 and selector 28.

The controller 22 includes output control signals, such as a flag for Intra/Inter coding and a flag for denoting transmitting.

However, the block matching method based on the SAD and MAE functions has many problems. For example, as shown in FIG. 2, assuming that the smallest SAD is N when a motion vector is (−16, −16) and the SAD is M when a motion vector is (0, 0), the motion vector of the current macroblock is (−16, −16) in the SAD or MAE-based block matching method. However, if M is just slightly larger than N, selecting the motion vector (−16, −16) leads to a more inefficient compression rate than selecting the motion vector (0, 0).

Further, the conventional method is inefficient since it neglects to consider the code rate and error relation for the difference between motion vectors.

SUMMARY OF THE INVENTION

Accordingly, in view of the foregoing problems and disadvantages of the conventional art, it is an object of the present invention to provide a motion estimating method which compresses data more efficiently than the conventional art by selecting a motion vector for enabling maximum compression rate in a rate allowance limit, when a video encoder based on the H.263 standard is implemented.

To achieve the above and other objects of the present invention, there is provided a motion estimating method in which each picture frame is divided into a predetermined number of macroblocks, and a candidate macroblock is selected from each of the similar macroblocks in a previous frame, and a motion vector and the difference between a current macroblock and the candidate macroblock are encoded. More specifically, the motion estimating method includes the steps of: (a) obtaining a motion vector $(x_o, y_o)$ which minimizes a predetermined error function, (b) assuming a preferred motion vector (x, y), (c) calculating a difference (x-diff, y-diff) between $(x_o, y_o)$ and (x, y), (d) obtaining a bit number corresponding to the number of bits needed to encode the x-diff and y-diff, (e) determining a bias based on a bias model according to the bit number, (f) obtaining a final cost function value based on a difference between a cost function value and a bias, (g) comparing the final cost function value with a predetermined allowance limit, (h) setting the assumed motion vector (x, y) as a motion vector for a current macroblock and updating the allowance limit by using the cost function value, if the cost function value is smaller than the predetermined limit value in step (g), and (i) discarding the assumed motion vector (x, y), if the cost function value is not smaller than the predetermined allowance limit value in the step (g).

BRIEF DESCRIPTION OF THE DRAWINGS

The above objects and advantages of the present invention will become more apparent through the following detailed description of a preferred embodiment of the present invention, with reference to the attached drawings in which:

FIG. 1 illustrates a motion vector predicting method recommended in the H.263 standard;

FIG. 2 shows a schematic diagram of a video source encoder in the H.263 standard;

DETAILED DESCRIPTION OF THE INVENTION

In theory, a code rate-error relation generally relates the number of errors to a given code rate, or a code rate possible under given errors, using a relationship derived from a code rate and an error.

In the present invention, the code rate-error relation is based on the Lagrangian cost function expressed by:

$$J = D + \lambda R \qquad (2)$$
$$= D + \lambda(R_{mv} + R_{res})$$

where J indicates an allowable error, and D indicates an error of a frame undergoing coding (including DCT-transform and quantization), and decoding (including inverse-transform and inverse-quantization). In the present invention, the aforementioned SAD or MAE value can be used as D. The variable $R_{mv}$ indicates the number of bits used to encode a motion vector, and $R_{res}$ indicates the number of bits added in consideration of an error after the quantization and inverse-quantization. The symbol $\lambda$ is called a Lagrangian multiplier, which corresponds to a slope of a code rate-error curve, and has a negative value since the code rate is inversely proportional to the number of errors.

In accordance with the present invention, the motion vector that yields the maximum compression rate under a given allowable error J is obtained.

Figure 3:
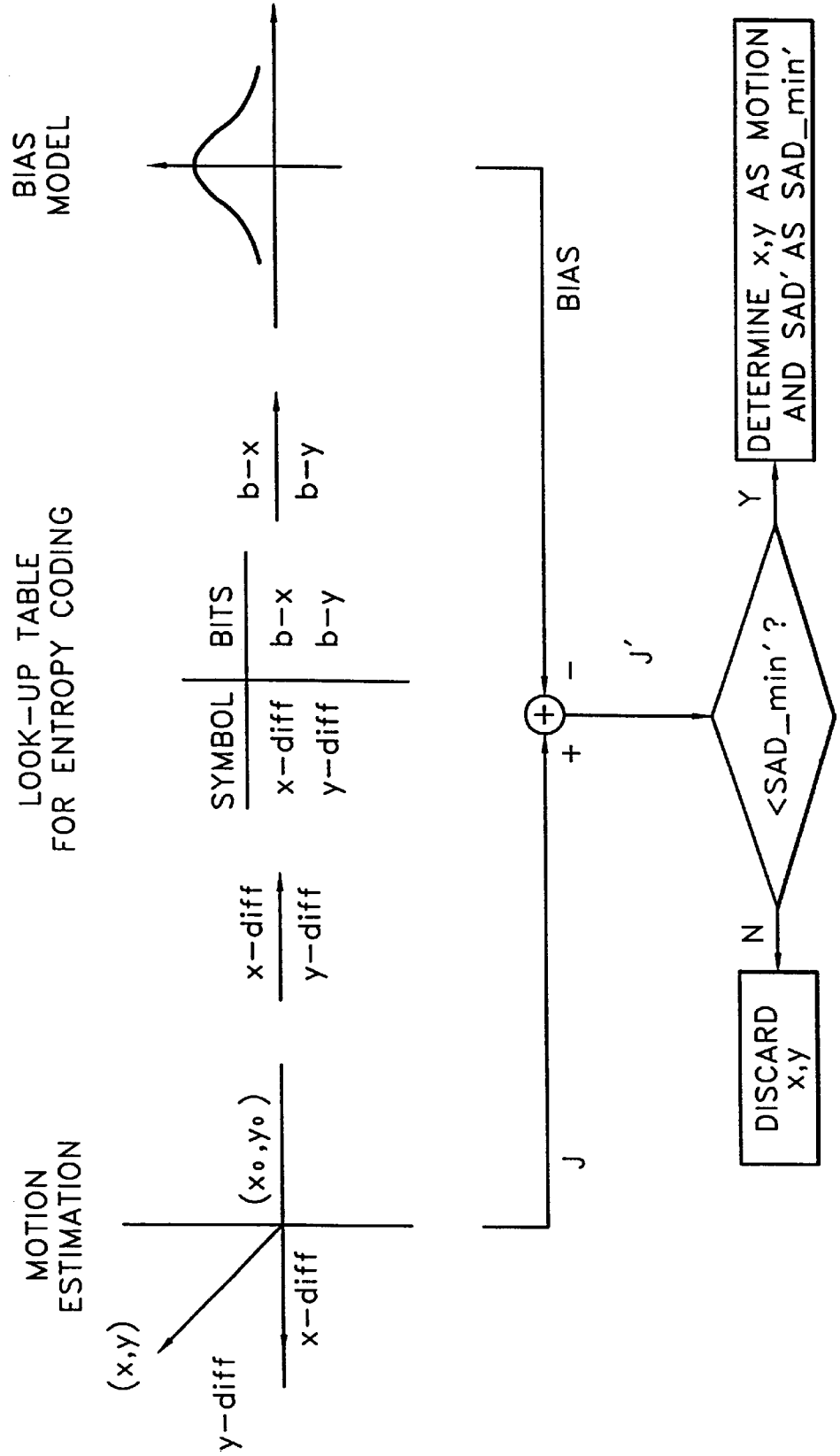
FIG. 3 illustrates a conceptual view of a motion estimating method according to a preferred embodiment of the present invention.
Figure 4:
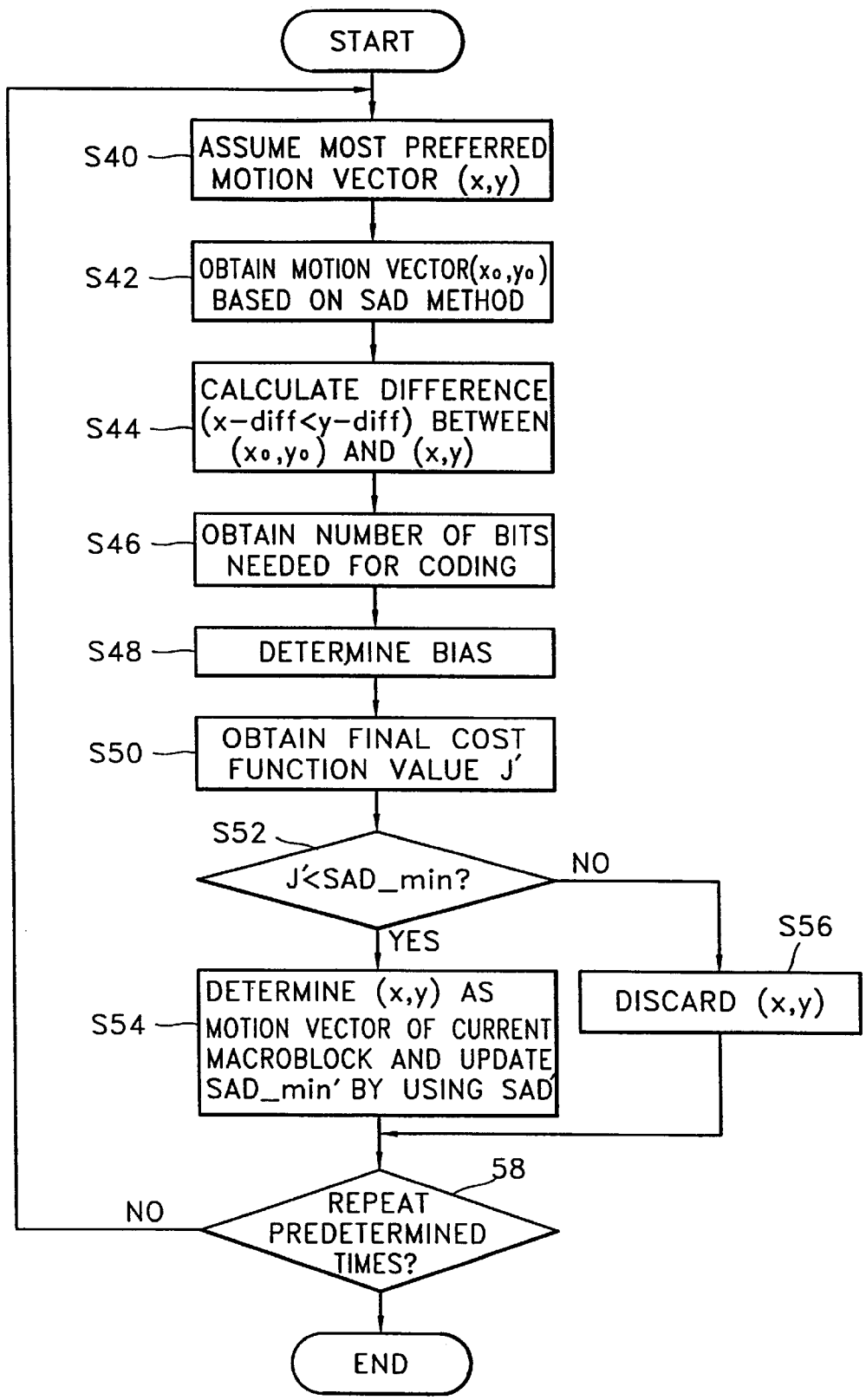
FIG. 4 shows a flowchart of the motion estimating method according to the preferred embodiment of the present invention.

A preferred embodiment of the present invention will be described with reference to FIGS. 3 and 4. FIG. 3 illustrates conceptually a motion estimating method according to a preferred embodiment of the present invention, and FIG. 4 illustrates a flowchart of the motion estimating method of the present invention.

In step S40, a preferred motion vector (x, y) is assumed. The preferred motion vector (x, y) is arbitrarily selected between (−16, −16) and (16, 16) in the case of a 16×16 block, and it is preferable to select one of MV1, MV2, and MV3 of FIG. 1. Then, in step S42, a motion vector $(x_o, y_o)$ is obtained based on the SAD function according to the H.263 standard.

In step S44, the difference (x-diff, y-diff) between (x, y) and $(x_o, y_o)$ is calculated. These values are sent to a look-up table to determine how many bits are needed for entropy-coding the values. In step S46, the look-up table outputs b-x and b-y, which are bit budgets for encoding the x-diff and y-diff. Then, in step S48, a bias to be added to the cost function J is determined, using b-x and b-y. The bias value is obtained from a bias model, and a portion before or after a vertical axis of a Gaussian function or a square of the Gaussian function or other functions (e.g., a linear model) are used as the bias model according to the application of the present invention as shown in FIG. 3. The horizontal axis of the bias model indicates bit budget information, that is, b-x and b-y, and its vertical axis indicates a bias value. The bias value generally ranges between 50 and 100, and has the same unit and meaning as those of a cost function value. In step S50, the bias is subtracted from the cost function value J, thereby obtaining a final cost function value J'.

In step S52, a determination is made as to whether the final cost function value J' is smaller than a predetermined allowance limit SAD_min. If the cost function value is smaller than the limit value, the current assumed motion vector (x, y) is determined as a motion vector of a current macroblock, and SAD_min is renewed by using J', in step S54. Meanwhile, if the cost function value is not smaller than the limit value, the assumed motion vector (x, y) is discarded, in step S56.

Steps S42 through S56 are repeatedly performed by re-assuming a preferred motion vector (x, y). A small motion vector is obtained, with given errors, by repeating the same procedure, for example two or three times.

As described above, according to the motion estimating method of the present invention, a small motion vector is selected by a heuristic approach, so that a compression rate can be increased within a code rate allowing limit based on a code rate-error relation in the conventional H.263 standard.

Meanwhile, since in the H.263 standard recommended by ITU-T, a motion vector finding method is not defined, but rather left to the discretion of a user, the above-described motion estimating method will be compatible with the H.263 standard.

There has thus been shown and described a novel motion estimating method which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A method of compressing data comprising the steps of dividing each picture frame into a predetermined number of macroblocks, selecting a candidate macroblock from each of the similar macroblocks in a previous frame, and encoding a motion vector and a difference between a current macroblock and said candidate macroblock, said method further including a motion estimating method, which comprises the steps of:

(a) obtaining a motion vector $(x_o, y_o)$ which minimizes a predetermined error function;

(b) assuming a preferred motion vector $(x, y)$;

(c) calculating a difference (x-diff, y-diff) between $(x_o, y_o)$ and $(x, y)$;

(d) obtaining a bit number corresponding to a number of bits needed to encode said x-diff and y-diff;

(e) determining a bias based on a bias model according to said bit number;

(f) obtaining a final cost function value by means of the difference between a cost function value and a bias;

(g) comparing said final cost function value with a predetermined allowance limit;

(h) setting said assumed motion vector $(x, y)$ as a motion vector for a current macroblock and updating said allowance limit by using said cost function value, if said cost function value is smaller than said limit value in said step (g); and (i) discarding said assumed motion vector $(x, y)$ if said cost function value is not smaller than said limit value in said step (g).

2. The method as defined in claim 1, wherein said step (b) comprises the step of selecting one of the motion vectors of a previous block, an upper block, and an upper right block.

3. The method as defined in claim 1, wherein said error function is a sum of the absolute difference (SAD) determined by the following equation:

$$SAD = \sum_x \sum_y |f(x, y) - f_i(x, y)|$$

where f and $f_i$ are sizes of signals in a current frame and a previous frame, respectively.

4. The method as defined in claim 1, wherein said error function is a mean absolute error (MAE) determined by the following equation:

$$MAE = \frac{1}{MN} \sum_x^M \sum_y^N [f(x, y) - f_i(x, y)]^2$$

where f and $f_i$ are the sizes of signals in a current frame and a previous frame, respectively, and M and N are the numbers of horizontally and vertically arranged pixels in each block, respectively.

5. The method as defined in claim 1, wherein said bias model is linear.

6. The method as defined in claim 1, wherein said bias model is a Gaussian function.

7. The method as defined in claim 1, wherein said bias model is the square of a Gaussian function.

* * * * *